(12) United States Patent
Moriyama et al.

(10) Patent No.: US 8,531,757 B2
(45) Date of Patent: Sep. 10, 2013

(54) DISPLAY MEDIUM AND DISPLAY ELEMENT, AND DISPLAY METHOD

(75) Inventors: Hiroaki Moriyama, Minamiashigara (JP); Yasuo Yamamoto, Minamiashigara (JP); Takayuki Takeuchi, Kanagawa (JP); Rie Ishii, Minamiashigara (JP); Jun Kawahara, Minamiashigara (JP)

(73) Assignee: Fuji Xerox Co., Ltd., Tokyo (JP)

( * ) Notice: Subject to any disclaimer, the term of this patent is extended or adjusted under 35 U.S.C. 154(b) by 2417 days.

(21) Appl. No.: 11/287,929

(22) Filed: Nov. 28, 2005

(65) Prior Publication Data
US 2006/0284829 A1 Dec. 21, 2006

(30) Foreign Application Priority Data
Jun. 17, 2005 (JP) ................. 2005-178060

(51) Int. Cl.
G02B 26/00 (2006.01)

(52) U.S. Cl.
USPC ......................................... 359/296

(58) Field of Classification Search
USPC ............... 359/296; 345/107, 105; 252/581, 252/582, 583, 586
See application file for complete search history.

(56) References Cited

U.S. PATENT DOCUMENTS

| | | | | |
|---|---|---|---|---|
| 4,925,704 A | * | 5/1990 | Sato et al. | 427/221 |
| 4,987,012 A | * | 1/1991 | Sato et al. | 427/221 |
| 5,846,657 A | * | 12/1998 | Wu | 428/402 |
| 6,017,584 A | | 1/2000 | Albert et al. | |
| 6,323,989 B1 | * | 11/2001 | Jacobson et al. | 359/296 |
| 6,816,146 B2 | * | 11/2004 | Harada et al. | 345/107 |
| 6,849,797 B2 | * | 2/2005 | Koyanagi et al. | 136/256 |
| 7,060,333 B2 | * | 6/2006 | Takeuchi et al. | 428/1.3 |
| 7,227,525 B2 | * | 6/2007 | Kishi | 345/107 |
| 7,312,916 B2 | * | 12/2007 | Pullen et al. | 359/296 |
| 7,397,597 B2 | * | 7/2008 | Verschueren et al. | 359/296 |
| 7,402,368 B2 | * | 7/2008 | Ogawa et al. | 430/108.1 |
| 7,485,419 B2 | * | 2/2009 | Lu et al. | 435/6 |
| 7,529,019 B2 | * | 5/2009 | Baesjou et al. | 359/296 |
| 7,580,179 B2 | * | 8/2009 | Sakurai et al. | 359/296 |
| 2003/0096113 A1 | * | 5/2003 | Jacobson et al. | 428/379 |
| 2006/0023296 A1 | | 2/2006 | Whitesides et al. | |
| 2006/0256425 A1 | | 11/2006 | Whitesides et al. | |
| 2006/0262060 A1 | | 11/2006 | Amundson | |

FOREIGN PATENT DOCUMENTS

| | | | |
|---|---|---|---|
| EP | 04103263 | * | 7/2004 |
| JP | 64-086116 | | 3/1989 |
| JP | 04-199085 | | 7/1992 |
| JP | 2000-035598 | | 2/2000 |
| JP | 2000-322004 | | 11/2000 |
| JP | 2002-162649 | | 6/2002 |
| JP | 2002-333643 | | 11/2002 |
| JP | 2004-522180 | | 7/2004 |
| WO | 02/057843 | | 7/2002 |

* cited by examiner

Primary Examiner — Tuyen Tra
(74) Attorney, Agent, or Firm — Fildes & Outland, P.C.

(57) ABSTRACT

A display medium includes a light control layer, wherein the light control layer includes mobile fine particles developing a color in a dispersion state and hetero-particles having characteristics different from those of the mobile fine particles. A display method includes at least one of the following steps: a step of displaying black color by allowing the mobile fine particles capable of developing a color in a dispersion state to aggregate; a step of displaying a color by allowing the mobile fine particles to disperse; or a step of displaying white color by reflection of the hetero-particles having characteristics different from those of the mobile fine particles.

30 Claims, 6 Drawing Sheets

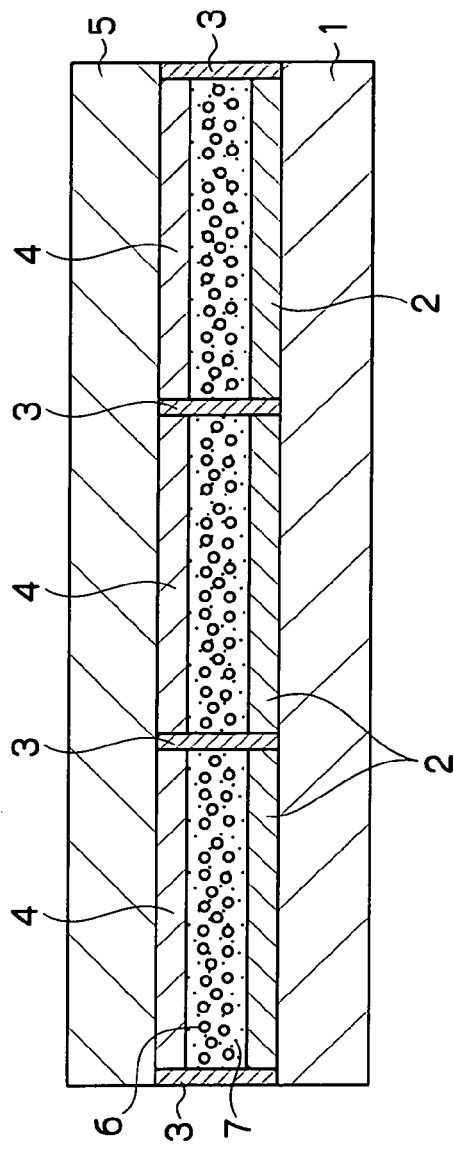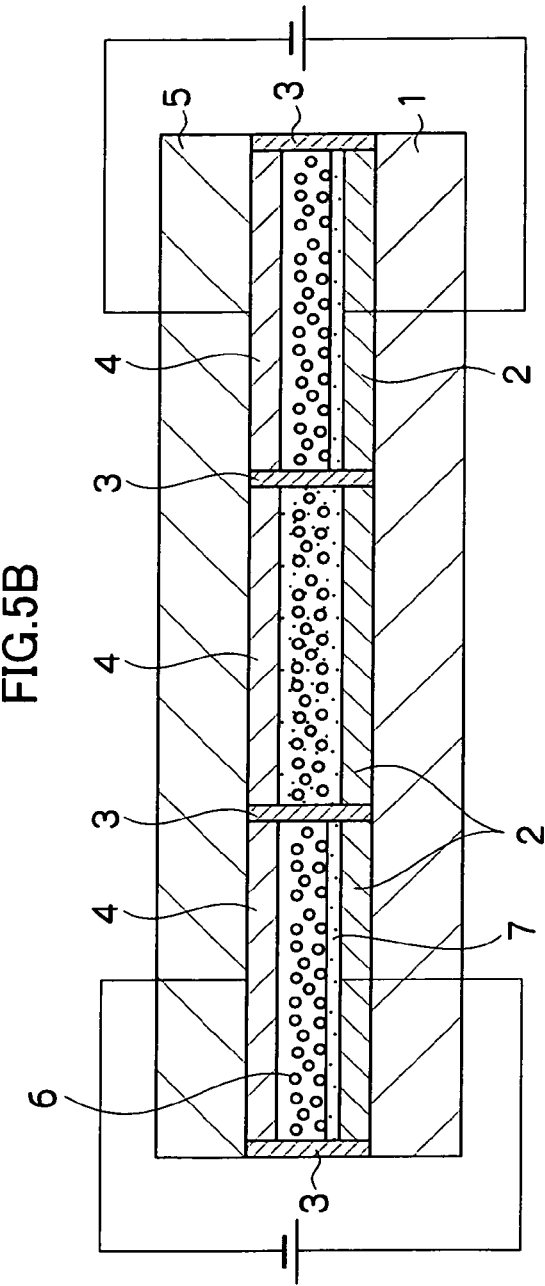

DISPLAY MEDIUM AND DISPLAY ELEMENT, AND DISPLAY METHOD

CROSS-REFERENCE TO RELATED APPLICATION

This application claims priority under 35 USC 119 from Japanese Patent Application No. 2005-178060, the disclosure of which is incorporated by reference herein.

BACKGROUND OF THE INVENTION

1. Field of the Invention

The invention relates to a display medium using mobile fine particles capable of being widely used for optical elements such as a light control glass, light control element and display element, as well as to a display element and a display method.

2. Description of the Related Art

With the progress of high information society, the need for electronic paper systems, color display systems and large area display systems is increasing. Display technologies such as CRT, liquid crystal, EL, LED and plasma displays have been developed for realizing these demands. In addition to these spontaneous emission systems, development of reflection display systems has been investigated as low electric power-consuming methods with less incompatibility to human eyes. Reflection liquid crystals have been a leading technology among the reflection display systems.

While there is a great need for a next-generation electronic paper display system, no promising technologies have been established so far. Electrophoresis methods, liquid crystal methods and organic EL methods have been considered as candidate methods. Since the liquid crystal method uses a filter method, reduction in thickness and weight of the medium is difficult. Since the organic EL method relies on spontaneous emission with no memory capability, the application range of this method is restricted.

Disclosed technologies for a display element using the electrophoresis method are as follows. For example, Japanese Patent Application Laid-Open (JP-A) No. 64-86116 discloses a method for delivering microcapsules, in which a dispersion medium and electrophoresis particles are sealed, between a pair of electrodes. JP-A No. 4-199085 describes a magnetophoresis method using microcapsules incorporating a magnetic fluid. Furthermore, U.S. Pat. No. 6,017,584 discloses a method for disposing a mixture of a plurality of colored particles in the same microcapsule and selectively driving these particles.

However, fine dot display and full color display have been impossible in any of these methods due to the use of microcapsules. The maximum number of colors that can be simultaneously displayed in JP-A No. 64-86116 is 2 colors, and multi-color display is impossible. In addition, it has been difficult in principle to selectively drive the particles in U.S. Pat. No. 6,017,584.

JP-A No. 2000-322004 discloses technology in which approximately the same amount of charged mobile particles are disposed in a plurality of segments that have been partitioned along the surfaces of a pair of substrates disposed at a given distance apart, and a dispersion medium is colored blue while charged mobile particles are colored black, in order to improve the quality of display.

However, full color display is also difficult in this construction, and the apparatus becomes complicated since the segments need to be parallel because color reproduction by subtractive mixture of colors by a combination of particles in each layer is impossible when the segments are laminated.

While JP-A 2000-35598 discloses a method in which cells or microcapsules for displaying colors are arranged in parallel for color display, high resolution as well as sufficient contrast cannot be obtained due to the parallel arrangement. Further, while JP-A No. 2002-333643 discloses a method in which at least two layers of electrophoresis parts containing light permeable particles/medium are laminated in the vertical direction, sufficient color density cannot be obtained since dyes are used for coloring the particles.

While JP-A No. 2002-162649 disclosed a method in which a plurality of housing parts for housing fine particles after electrophoresis are provided, reproducibility of colors is poor, and thus the method fails to obtain high contrast since particles having different colors must be disposed in parallel for color display.

SUMMARY OF THE INVENTION

The inventors of the invention have completed the invention by finding, through intensive studies based on the situations as described above, that an excellent display medium could be obtained by taking advantage of the color strength due to the surface plasmon resonance of mobile fine particles (for example metal colloid particles), and by using hetero-particles having characteristics different from those of the mobile fine particles.

The invention provides:

<1> a display medium comprising a light control layer, wherein the light control layer comprises mobile fine particles developing a color in a dispersion state and hetero-particles having characteristics different from those of the mobile fine particles;

<2> the display medium of <1>, wherein the hetero-particles are white colored particles;

<3> the display medium of <1>, wherein the volume average particle diameter of the hetero-particles are larger than that of the mobile fine particles;

<4> the display medium of <1> comprising a plurality of light control unit cells including the light control layer, wherein respective light control unit cells are aligned parallel to a substrate;

<5> the display medium of <1> comprising a plurality of light control unit cells including the light control layer, wherein the plural light control unit cells comprise light control unit cells developing red, blue and green colors, respectively;

<6> the display medium of <1>, wherein the mobile fine particles are charge transfer fine particles;

<7> the display medium of <6>, wherein the charge transfer fine particles are metal colloid particles having a color strength due to the surface plasmon resonance;

<8> the display medium of <7>, wherein the metal colloid particles comprise at least any one of gold and silver;

<9> the display medium of <7>, wherein the metal colloid particles have a volume average particle diameter in the range of 1 to 100 nm;

<10> the display medium of <9>, wherein the metal colloid particles have a volume average particle diameter in the range of 2 to 50 nm;

<11> the display medium of <1>, wherein the hetero-particles have a volume average particle diameter in the range of 0.1 to 50 μm;

<12> the display medium of <11>, wherein the hetero-particles have a volume average particle diameter in the range of 1 to 20 μm;

<13> the display medium of <1>, wherein the volume filling factor of the hetero-particles in the light control layer is 30 to 95% by volume;

<14> the display medium of <1>, wherein the hetero-particles are spacer particles;

<15> the display medium of <14>, wherein the spacer particles are white colored particles;

<16> a display element comprising a display medium having a light control layer and fine particle control part, wherein the light control layer comprises mobile fine particles for developing a color in a dispersion state and hetero-particles having characteristics different from those of the mobile fine particles, and fine particle control part is provided close to the light control layer;

<17> the display element of <16>, wherein fine particle control part is an electric field applying part that applies an electric field to the light control layer;

<18> the display element of <17>, wherein the electric field applying part is a pair of electrodes;

<19> the display element of <16>, wherein the hetero-particles are white colored particles;

<20> the display element of <16>, wherein the hetero-particles have a volume average particle diameter larger than that of the movable fine particles;

<21> the display element of <16> comprising a plurality of light control unit cells containing the light control layer, wherein respective light control unit cells are aligned parallel to a substrate;

<22> the display element of <16> comprising a plurality of light control unit cells including the light control layer, wherein the plural light control unit cells comprises the light control unit cells developing red, blue and green colors, respectively;

<23> the display element of <16>, wherein the mobile fine particles are metal colloid particles having a color strength due to the surface plasmon resonance;

<24> the display element of <23>, wherein the metal colloid particles contain at least any one of gold and silver;

<25> the display element of <23>, wherein the metal colloid particles have a volume average particle diameter in the range of 1 to 100 nm;

<26> the display element of <25>, wherein the metal colloid particles have a volume average particle diameter in the range of 2 to 50 nm;

<27> the display element of <16>, wherein the hetero-particles are spacer particles;

<28> the display element of <27>, wherein the spacer particles are white colored particles; and <29> a display method using a display medium comprising a light control layer, wherein the light control layer comprises mobile fine particles developing a color in a dispersion state and hetero-particles having characteristics different from those of the mobile fine particles, wherein the method comprising at least one of the following steps:

a step of displaying black color by allowing mobile fine particles capable of developing a color in a dispersion state to aggregate;

a step of displaying a color by allowing the mobile fine particles to disperse; or a step of displaying white color by reflection of hetero-particles having characteristics different from those of the mobile fine particles.

BRIEF DESCRIPTION OF THE DRAWINGS

FIG. 1 is provided for describing the method for manufacturing the display element of the invention, wherein

FIG. 2 illustrates an embodiment of the display element of the invention, wherein

FIG. 4 shows a different embodiment of the display element of the invention, wherein

FIG. 5 shows a further different embodiment of the display element of the invention, wherein FIG. 5A shows the element before applying a voltage, and FIG. 5B shows the element when a voltage has been applied; and FIG. 6 shows a further different embodiment of the display element of the invention, wherein

DETAILED DESCRIPTION OF THE INVENTION

Figure 1A:
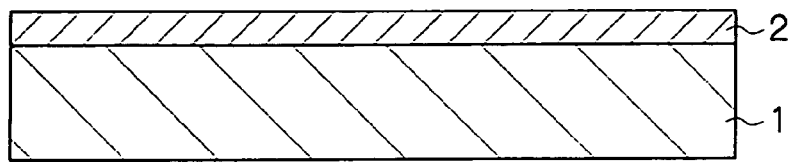
FIG. 1A shows an electrode formed on the substrate.
Figure 1B:
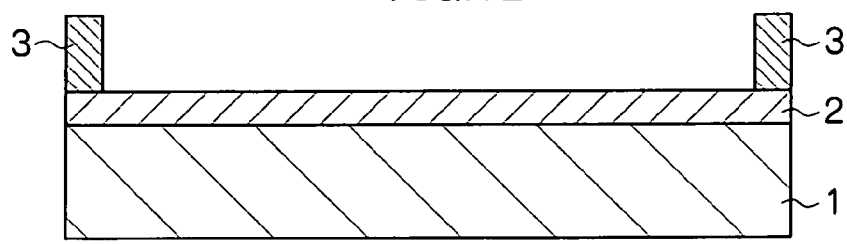
FIG. 1B shows partition walls provided on the electrode.
Figure 1C:
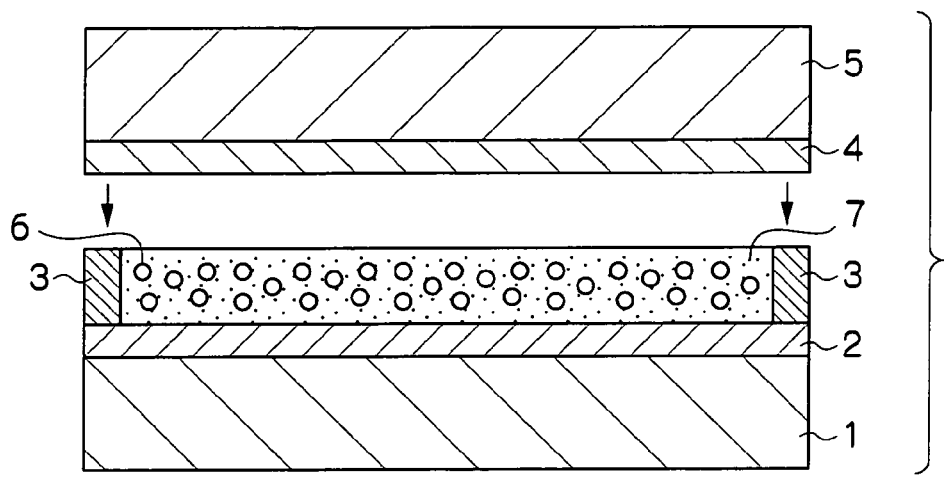
FIG. 1C shows a filled dispersion solution on which a second substrate is to be bonded.

The invention provides a display medium and a display element being less dependent on the angle of vision with good contrast, and a display method.

The invention will be explained in detail hereinafter.

[1] Display Medium and Display Element

The display medium of the invention comprises a light control layer having mobile fine particles capable of color development in a dispersed state and hetero-particles having characteristics different from those of the mobile fine particles. A display medium comprising a light control layer having the mobile fine particles and spacer particles may be provided by using the hetero-particles as the spacer particles. The display element of the invention is constructed so that electric field applying part is provided for applying an electric field to the display medium, or so that the hetero-particles of the display medium serve as spacer particles, and part that controls displacement of the mobile fine particles (for example electric field application part that applies an electric field to the light control layer, or magnetic field generation part) is provided. A plurality of light control cells each including a light control layer, or a plurality of light control layers is provided based on the construction as described above. Specifically, a display element is available by providing part that controls displacement (dispersion and coagulation) of the mobile fine particles (for example electric field application part that applies an electric field) to the light control layer comprising the mobile fine particles and hetero-particles. Specific construction of the light control layer and the display medium (display element) of the invention will be explained below.

(Light Control Layer)

The light control layer comprises the mobile fine particles capable of color development in a dispersion state and hetero-particles having characteristics different from those of the mobile fine particles, along with an insulating liquid, a polymer resin, a high molecular weight pigment and a dispersant, if necessary. The light control layer is an area containing the materials as described above, and exhibits a function for displaying various colors when used as the display element.

(1) Mobile Fine Particles

The mobile fine particles contained in the light control layer are able to develop a color in a dispersion state. In other words, the mobile fine particles exhibit different hues when they are dispersed in a medium in the color control layer and when not dispersed (for example coagulated). Accordingly, development of a desired hue may be controlled by controlling the dispersion state of the mobile fine particles. The "different hues" described above include not only when absorption peaks at specified wavelengths are different, but also when color densities are different at the same hue.

While it is essential for the mobile fine particles that they are able to develop a color in a dispersion state, and are movable by controlling either application of an electric field (a voltage), application of a magnetic field or temperatures, other conditions are not particularly restricted. The mobile fine particles are preferably charge transfer fine particles, and are preferably metal colloid particles having color strength due to the surface plasmon resonance from the viewpoint of color developability and stability. While examples of the metal colloid particles are described hereinafter, the particles are not restricted thereto.

The hue may be controlled by changing the mobile fine particles, particularly by changing the kind, shape and particle diameter (volume average particle diameter) of the metal colloid particles. Color development of the metal colloid particles (for example gold colloid particles) is ascribed to plasma vibration of electrons, or to a color development mechanism called as plasmon absorption. Color development by plasmon absorption is considered to be due to vibration of free electrons in a metal by an optical electric field. This vibration permits a charge to be displayed on the surface of the particle that generates non-linear polarization. Color developed by the metal colloid particles has high transmittance and is excellent in durability. Color development in such metal colloid particles are observed in particles having a particle diameter of several to several tens nanometers, or in so-called nano-particles, and colloid particles having a narrow particle diameter distribution are advantageous considering the uses as coloring materials.

Examples of the metal component constituting the metal colloid particles include noble metals (gold, silver, ruthenium, rhodium, palladium, osmium, iridium, platinum, etc.) and copper. Gold, silver or platinum, or an alloy containing at least one of these noble metals is preferable among these noble metals, and an alloy containing either gold or silver is more preferable.

The method for obtaining the metal colloid particles known in the art include a chemical method for preparing nano-particles through metal atoms or metal clusters by reducing metal ions, or a physical methods in which a bulk metal is evaporated in an inert gas to form fine metal particles, which are trapped with a cold trap; or a thin metal film is formed on a thin polymer film, the thin metal film is broken by heating, and the metal fine particles are dispersed in the polymer in a solid state. While general examples of the chemical method will be explained later since the method is advantageous for preparing the metal colloid particles with no need of special apparatus, the method is not restricted thereto.

Materials of the metal colloid particles preferably contain metal compounds comprising the metal components as described above. The metal compounds are not particularly restricted so long as they contain the metal components as described above, and examples of them include chlorauric acid, silver nitrate, silver acetate, silver perchlorate, potassium chloroplatinate, copper (II) chloride, copper (II) acetate and copper (II) sulfate.

While the metal colloid particles may be obtained as a dispersion solution of the metal colloid particles protected with a dispersant by reducing the metal compound dissolved in a solvent into a metal, the particles may be a solid sol by evaporating the solvent of the dispersion solution. However, other forms of the metal colloid particles may be available.

A polymer dispersant for pigments described below may be used when the metal compound is dissolved. Stable metal colloid particles protected with the dispersant may be obtained by using the polymer dispersant for pigments.

When metal colloid particles are used in the invention, the metal colloid particles may be used as a dispersion solution, or also as a re-dispersed solution of the solid sol obtained by removing the solvent. The method for obtaining the metal colloid is not particularly restricted in the invention.

When the metal colloid particles are used as a dispersion solution, the solvent for preparing the solution is preferably an insulating liquid as will be explained later. When the solid sol is used by re-dispersion, on the other hand, the solvent used for preparing the solid sol is not particularly restricted including the insulating liquid as well as various other liquids. However, the liquid for re-dispersion is preferably the insulating liquid to be described later.

The volume average particle diameter of the mobile fine particles is preferably in the range of 1 to 100 nm, more preferably in the range of 2 to 50 nm. The mobile fine particles in the range of 1 to 100 nm are significant from the viewpoint of practical applicability and color density. Color density may be particularly improved when the volume average particle diameter is in the range of 2 to 50 nm by preventing the particles from being readily precipitated. Consequently, dependency on the angle of vision may be more reduced while contrast is improved.

The metal colloid particles are able to develop various colors depending on their metal component and shape, and on the volume average particle diameter. Accordingly, various hues including RGB color development can be obtained and used as the color display elements of the invention by using the mobile fine particles having controlled kinds of the metal, shape and volume average particle diameter. The metal colloid particles can be formulated into a display element of a RGB full-color method by controlling the shape and particle diameter of the metal colloid particles.

While the volume average particle diameter of the metal colloid particles that are able to develop respective R, G and B colors in the RGB method cannot be particularly restricted since it depends on the metal used, preparation conditions of the particles and the shape of the particles, the gold colloid particles for example, tend to develop R color, G color and B color in this order as the volume average particle diameter is increased.

The methods for measuring the volume average particle diameter employed in the invention include a laser diffraction-scattering method by which a laser light is irradiated to the particle group to measure an average particle diameter from intensity distribution patterns of the diffracted or scattered light.

The content (% by mass) of the mobile fine particles relative to the total mass of the light control layer is not particularly restricted so long as a desired hue is obtainable at the concentration of the particles, and it is effective for the display element to adjust the concentration depending on the desired hue. In other words, the content may be small when the light control layer is thick while the content may be large when the light control layer is thin for obtaining a desired hue. The content is usually in the range of 0.01 to 50% by mass relative to the total mass of the light control layer.

The metal colloid particles may be prepared by a conventional preparation method described in a literature entitled "Synthesis, Preparation and Control Technology of Metal Nano-Particles, and Scope of Their Application" (published by Technical Information Institute, Co., LTD. 2004). While an example of the method is described below, the method is not restricted thereto.

—Solid Sol—

An example of the metal solid sol for preparing the metal colloid particles will be explained below.

The content of the metal colloid particles is preferably 50 mmol or more per 1 kg of the polymer dispersant for pigments in the solid sol of the metal colloid particles of the invention from the viewpoint of color developability. Color developability may be insufficient when the concentration of the metal colloid particles is less than 50 mmol. The concentration is more preferably 100 mmol or more.

The volume average particle diameter of the metal colloid particles is preferably 1 to 100 nm, more preferably 2 to 50 nm, in the solid sol of the metal colloid. The metal solid sol of the invention preferably exhibits a narrow particle diameter distribution. Wide particle diameter distribution is not preferable since color saturation is lowered.

The solid sol as described above has high color saturation and good color developability due to high concentration of the metal colloid particles. Since the solid sol has good compatibility with polymer resins (binders), it is stable without coagulation by adding to the polymer resin (binder) with sufficient color developability. Other additives may be added, if necessary. The solid sol may be used as hydrosol and organosol by dissolving in an appropriate solvent.

—Production Method of Solid Sol—

While an example of production methods of the solid sol is described below, the method is not restricted thereto. The metal compound is dissolved in a solvent, a polymer dispersant for pigments is added, the metal compound is reduced to a metal to form the metal colloid particles protected with the polymer dispersant for pigments, and the solid gel is obtained thereafter by removing the solvent.

The metal compound is used by dissolving in a solvent in the production method described above. The solvent is not particularly restricted so long as it is able to dissolve the metal compound, and examples of the solvent include water and water-soluble organic solvents such as acetone, methanol and ethylene glycol. These solvents may be used alone, or as a combination of at least two of them. Water and a water-soluble organic solvent are preferably used together in the invention.

When the solvent is a mixed solvent comprising water and a water-soluble organic solvent, a solution is preferably prepared by adding the water-soluble organic solvent after dissolving the metal compound in water. Here, the metal compound should be dissolved in water preferably at a concentration of 50 mM (50 mmol/l) in water. A solid sol containing a high proportion of the metal colloid particles cannot be obtained when the concentration is less than 50 mM. The concentration is preferably 100 mM or more.

When silver is used as the metal component, the aqueous solution preferably has a pH of 7 or less. When the pH exceeds 7, by-products such as silver oxide are formed by reduction of silver ions and the aqueous solution becomes turbid when, for example, silver nitrate is used as the silver compound. The pH is preferably adjusted to 7 or less by adding about 0.1 N of nitric acid, when the pH of the aqueous solution exceeds 7.

The water-soluble organic solvent is preferably added to water dissolving the above metal compound so that the volume ratio of the solvent is 1.0 or more. The polymer dispersant for pigments does not dissolve when the ratio is less than 1.0. The ratio is preferably 5.0 or more.

Addition of the polymer dispersant for pigments to the solution of the metal compound is also effective for preparing the metal colloid particles of the invention. The polymer dispersant for pigments is preferably insoluble in water when the solvent is mixed solvent comprising water and water-soluble organic solvent, since precipitation of the colloid particles is difficult for obtaining a solid sol by removing the water-soluble organic solvent when the dispersant is soluble in water. Examples of the water insoluble polymer dispersant for pigments include Disperbyk-166 (manufactured by BYK Chemie Co.), and Solsperse 24000 and Solsperse 28000 (manufactured by Zeneca Co.).

The amount of addition of the polymer dispersant for pigments is preferably 20 to 1,000 parts by weight relative to 100 parts by weight of the metal. Dispersibility of the metal colloid particles is insufficient when the amount is less than 20 parts by weight, while a large amount of the polymer dispersant for pigments is mingled into the binder resin by blending the binder resin with a paint and molded resin to readily cause defective properties when the amount of addition of the polymer dispersant exceeds 1,000 parts by weight. The amount of addition of the polymer dispersant is more preferably 50 to 650 parts by weight.

The metal ions are reduced after adding the polymer dispersant for pigments to the solution of the metal compound in the preparation of the metal colloid particles of the invention. The reduction method is not particularly restricted, and includes, for example, a chemical reduction method by adding a compound, and a photoreduction method using a high-pressure mercury lamp.

The compound is not particularly restricted, and alkali metal borohydride such as sodium borohydride, hydrazine compounds, citric acid or salts thereof, and succinic acid and salts thereof that have been used as reducing agents may be used. Amines may be used in the invention other than the reducing agents above.

The metal ion is reduced to a metal at around room temperature by adding the amine into the solution of the metal compound with stirring. Using the amine eliminates the use of a dangerous and toxic reducing agent, and the metal compound can be reduced at a reaction temperature of 5 to 100° C., preferably 20 to 80° C., without heating or without using any special light illuminating apparatus.

The amine is not particularly restricted, and examples of the amine include aliphatic amines such as propylamine, butylamine, hexylamine, diethylamine, dipropylamine, dimethylamine, diethylmethylamine, triethylamine, ethylenediamine, N,N,N',N'-tetramethyl ethylenediamine, 1,3-diaminopropane, N,N,N',N'-tetramethyl-1,3-diaminopropane, triethylene tetramine and tetraethylene pentamine; alicyclic amines such as piperidine, N-methyl piperidine, piperazine, N,N'-dimethyl piperazine, pyrrolidine, N-methyl pyrrolidine and morpholine; aromatic amines such as aniline, N-methyl aniline, N,N-dimethyl aniline, toluidine, anisidine and phenetidine; and aralkyl amines such as benzylamine, N-methyl benzylamine, N,N-dimethyl benzylamine, phenethylamine, xylylenediamine and N,N,N',N'-tetramethyl xylylenediainine. Other examples include alkanolamines such as methylamino ethanol, dimethylaminoethanol, triethanolamine, ethanolamine, diethanolamine, methyl diethanolamine, propanolamine, 2-(3-aminopropylamino)ethaniol, butanolamine, hexanolamine and dimethylaminopropanol. Alkanolamines are preferable among them.

The amount of addition of the amine is preferably 1 to 50 mol per 1 mol of the metal compound. Reduction is insufficient when the amount is less than 1 mole, while coagulation resistance of the metal colloid particles formed decreases when the amount exceeds 50 moles. The more preferable amount of addition of the amine is 2 to 8 moles.

No heating and special illumination apparatus are needed when sodium borohydride is used as the reducing agent since the reducing reaction proceeds at room temperature.

The amount of addition of sodium borohydride is preferably 1 to 50 moles per 1 mole of the metal compound. Reduction is insufficient when the amount is less than 1 mole, while coagulation resistance of the metal colloid particles formed decreases when the amount exceeds 50 moles. The more preferable amount of addition of amine is 1.5 to 10 moles.

When citric acid or a salt thereof is used as the reducing agent, the metal ions are reduced by reflux with heating in the presence of an alcohol. Sodium citrate is preferably used as citric acid or a salt thereof.

The amount of addition of citric acid or a salt thereof is preferably 1 to 50 moles per 1 mole of the metal compound. Reduction is insufficient when the amount is less than 1 mole, while coagulation resistance of the metal colloid particles formed decreases when the amount exceeds 50 moles. The more preferable amount of addition of amine is 1.5 to 10 moles.

In the preparation of the metal colloid of the invention, the solvent is removed after allowing the metal colloid particles protected with the polymer dispersant for pigments to precipitate after the metal ions have been reduced. When water and a water-soluble organic solvent are used as the solvents, the solvents may be removed according to the following methods depending on the property of the polymer dispersant for pigments.

When the polymer dispersant for pigments is insoluble in water, it is preferable that the water-soluble solvent is removed by evaporation, and water is removed after allowing the metal colloid particles protected with the polymer dispersant for pigments to precipitate. Since the polymer dispersant for pigments is insoluble in water, the metal colloid particles protected with the polymer dispersant for pigments are precipitated by removing the water-soluble organic solvent.

The evaporation rate of the water-soluble organic solvent is preferably larger than that of water. When the evaporation rate of the organic solvent is smaller than water, the water-soluble organic solvent cannot be removed first and the metal colloid particles cannot be precipitated in the process for forming a solid sol by removing the solvent when a water-insoluble polymer dispersant for pigments is used.

When the polymer dispersant for pigments is soluble in an organic solvent, the metal colloid particles protected with the polymer dispersant for pigments can be precipitated by adding an excess amount of a non-polar organic solvent that does not dissolve the polymer dispersant for pigments, followed by removing the solvent by decantation.

The metal colloid particles protected with the polymer dispersant for pigments may be washed with ion-exchange water after removing the solvent. When the metal colloid particles protected with the polymer dispersant for pigments is precipitated by adding the non-polar organic solvent, the colloid particles may be washed with the non-polar solvent.

In the manufacturing method of the solid sol as described above, the solid sol has a high color density and color saturation since the solid sol obtained has an average colloid particle diameter of 1 to 100 nm with a narrow particle diameter distribution.

The manufacturing method of the solid sol of the invention is simple with a small number of steps comprising forming a solution by dissolving the metal compound in a solvent, reducing the compound into a metal after adding the polymer dispersant for pigments, and removing the solvent. The solid sol manufactured has high color saturation while the sol contains the metal colloid particles in a higher concentration than conventional metal solid sols. In particular, the solid sol can be simply manufactured under a mild condition of 20 to 80° C. by using alkanolamines.

While the metal colloid particles can be prepared by the methods as described above, commercially available metal colloid particles may be used for the metal colloid particles of the invention so long as they are able to develop colors in a dispersion state.

While the metal colloid particles specifically prepared by using methods (i) to (iv) below, the methods are not restricted thereto.

—Preparation Method of Metal Colloid Particles—

The dispersion solution of the metal colloid particles of the invention may be prepared in either an aqueous system or a non-polar solvent system. For example, while the dispersion solution of the metal colloid particles using gold or silver may be prepared by the following preparation methods, the method is not restricted thereto.

(i) After dissolving a metal compound (for example, hydrogen tetrachloroaurate (III) tetrahydrate) in an insulating liquid (for example, water), an aqueous solution containing 1.5 times by weight of the polymer dispersant (for example, Solsperse 20000) for pigments relative to the weight of a metal (for example, gold) is mixed with the solution above with stirring. An aliphatic amine (for example, dimethylaminoethanol) is added to this mixed solution to start a reducing reaction of aurate ions, followed by filtration and concentration to obtain a solution of gold colloid particles.

(ii) After dissolving a metal compound (for example, hydrogen tetrachloroaurate (III) tetrahydrate) in water, a solution containing 1.5 times by weight of the polymer dispersant (for example, Solsperse 24000) for pigments in a polar organic solvent (for example, acetone) relative to the weight of a metal (for example, gold) is mixed with the aqueous solution above with stirring.

An aliphatic amine (for example, dimethylaminoethanol) is added to this mixed solution to start a reducing reaction of aurate ions, followed by evaporation of the polar solvent to obtain a solid sol comprising the gold colloid particles and polymer dispersant for pigments. The solid sol is washed with water by decantation, and a solution of the gold colloid particles is obtained by adding a polar organic solvent (for example, ethanol).

(iii) After dissolving a metal compound (for example, silver (I) nitrate) in water, an aqueous solution containing 1.5 times by weight of the polymer dispersant (for example, Solsperse 20000) for pigments is mixed with the solution above with stirring. After starting a reducing reaction of silver ions by adding an aliphatic amine (for example, dimethylaminoethanol) to this mixed solution, an aqueous solution of silver colloid particles is obtained after filtration and concentration.

(iv) After dissolving a metal compound (for example, silver (I) nitrate) in water, a solution containing 1.5 times by weight of the polymer dispersant (for example Solsperse 24000) for pigments dissolved in a polar solvent (for example, acetone) is mixed with the solution above with stirring. After starting a reducing reaction of silver ions by adding an aliphatic amine (for example, dimethylaminoethanol) to this mixed solution, the polar solvent is evaporated to obtain a solid sol comprising the silver colloid particles and polymer dispersant for pigments. The solid sol is washed with water by decantation thereafter, and a solution of solvent-base silver colloid particles is obtained by adding a non-polar solvent (for example, toluene).

The metal colloid particles and solutions thereof described in JP-A No. 11-76800 can be favorably used.

(2) Hetero-Particles

The light control layer comprises hetero-particles having characteristics different from those of the mobile fine particles. Since the hetero-particles have characteristics different from those of the mobile fine particles, they may form, for example, a display element capable of multicolor display. The "different characteristics" as used herein refer to properties and aspects different from those of the mobile fine particles, and specific examples of the characteristics include different hues (including color densities), different configurations (different volume average particle diameters and different shapes), different mobility and different functions (for example, the mobile fine particles have a color display function while hetero-particles have a spacer function). When the hetero-particles are white particles, in particular, dependency on the angle of vision may be more reduced by providing the hetero-particles close to an observation surface.

The hetero-particles are preferably white particles from consideration for the improvement in the contrast of the display element. The density of the white color is not restricted when the hetero-particles are white particles, and the color may be visually recognized to be white.

The volume average particle diameter (X) of the hetero-particles is preferably larger than the volume average particle diameter (Y) of the mobile fine particles. The ratio between them (X/Y) is preferably 2 to 50,000, more preferably 20 to 10,000. The mobile fine particles can displace through the space between the hetero-particles when the hetero-particles are larger than the mobile particles, and color display response by the mobile fine particles may be improved.

The volume average particle diameter of the hetero-particles is preferably 0:1 to 50 μm, more preferably 1 to 20 μm. The diameter of 0.1 to 50 μm permits an effect for taking advantage of the hetero-particles as spacers to be exhibited.

Any materials including organic and inorganic materials may be used without restriction for the hetero-particles. Examples of the organic material include a melamine resin, acrylic resin and polyester resin, while examples of the inorganic material include titanium oxide, silica and magnesium oxide.

The volume filling factor of the hetero-particles in the light control layer is preferably 30 to 95% by volume, more preferably 50 to 90% by volume. A volume filling factor of 30 to 95% permits the color of the hetero-particles, for example white color, to be efficiently displayed.

While the hetero-particles can be used as color display particles that develop a different hue from that of the mobile fine particles, they may be also used as spacers of the light control cell from the viewpoint of uniformity of the thickness of the light control layer.

(3) Insulating Liquid

An insulating liquid is preferably used for the dispersion medium of the metal colloid particles. Specific examples of the favorably used insulating liquid include hexane, cyclohexene, toluene, xylene, decane, hexadecane, kerosene, paraffin, isoparaffin, silicone oil, dichloroethylene, trichloroethylene, perchloroethylene, high purity petroleum, ethylene glycol, alcohols, ethers, esters, dimethylformamide, dimethylacetamide, dimethylsulfoxide, N-methyl pyrrolidone, 2-pyrrolidone, N-methyl formamide, acetonitrile, tetrahydrofuran, propylene carbonate, ethylene carbonate, benzin, diisopropyl naphthalene, olive oil, isopropanol, trichlorotrifluoroethane, tetrachloroethane and dibromotetrafluoroethane, and mixtures thereof Water (so-called pure water) may be preferably used by removing impurities so that water has the following volume resistivity. The volume resistivity is preferably $10^3$ Ω·cm or more, more preferably $10^7$ to $10^{19}$ Ω·cm or more, and further preferably $10^{10}$ to $10^{19}$ Ω·cm. Such volume resistivity permits air bubbles to be more efficiently suppressed from being generated by electrolysis of the liquid caused by an electrode reaction, and excellent repeating stability may be obtained without impairing electrophoretic characteristics of the particles for every switching of electricity.

While acids and alkali, salts, dispersion stabilizing agents, stabilizing agents for anti-oxidation and UV absorption, antibiotics and antiseptics may be added, if necessary, they are preferably added so that volume resistivity falls within the range specified above.

(4) Polymer Resin

The mobile fine particles (metal colloid particles) are preferably dispersed in a polymer resin. The polymer resin is preferably a polymer gel or network polymer.

Examples of the polymer resin include naturally occurring polymer gels such as agarose, agaropectin, amylase, sodium alginate, propyleneglycol alginate, isolichenan, insulin, ethyl cellulose, ethyl hydroxyethyl cellulose, curdlan, casein, carrageenan, carboxymethyl cellulose, carboxymethyl starch, callose, agar, chitin, chitosane, silk fibroin, guar gum, queens seed, quince seed, crown gall polysaccharide, glycogen, glucomannan, keratan sulfate, keratin protein, collagen, cellulose acetate, gellan gum, gelatin, vegetable ivory mannan, tunicin, dextran, dermatan sulfate, starch, tragacanth gum, nigeran, hyaluronic acid, hydroxyethyl cellulose, hydroxypropyl cellulose, funoran, decomposed xyloglucan, pectin, pophylian, methyl cellulose, methyl starch, laminaran, lichenan, lenthinan and locust bean gum, as well as almost all synthetic polymer gels.

Other examples include polymers containing functional groups such as alcohol, ketone, ether, ester and amide in repeating units, for example polyvinyl alcohol, poly(meth) acrylamide, polyvinyl pyrrolidone and polyethylene oxide, and copolyiners containing these polymers. Gelatin, polyvinyl alcohol and poly(meth)acrylamide are preferably used among them from the viewpoint of stability in manufacturing and electrophoretic characteristics. These polymer resins are preferably used together with the insulating liquid.

(5) Polymer Dispersant for Pigments

While the polymer dispersant for pigments is not particularly restricted, those described below can be favorably used.

They are (i) a polymer having pigment affinity groups on the main chain and/or plural side chains while the polymer has a comb-like structure comprising a plurality of side chains constituting solvation portions; (ii) a polymer having a plurality of pigment affinity portions comprising pigment affinity groups in the main chain; and (iii) a linear polymer having pigment affinity groups comprising pigment affinity groups at the terminal of the main chain.

The pigment affinity group as used herein refers to a functional group having strong absorption strength on the surface of the pigment. Examples of them include tertiary amino groups, quaternary ammonium, heterocyclic groups having basic nitrogen atoms, hydroxyl group and carboxyl group, in an organosol; and phenyl group, lauryl group, stearyl group, dodecyl group and oleyl groups, in a hydrosol. The pigment affinity group exhibits strong affinity to metals. The polymer dispersant for pigments is able to display sufficient performance as a protective colloid of metals by possessing the pigment affinity group.

The polymer (i) of the comb-like structure comprises a plurality of side chains constituting the solvation portion as well as a plurality of the pigment affinity groups, and these side chains are bonded to the main chain as if they are comb teeth. The structure as described above is named as the comb-like structure. A plurality of pigment affinity groups may present not only at the terminal of the side chain, but also at the midway of the side chain and in the main chain. The solvation portion has affinity to the solvent, and has a hydrophilic or hydrophobic structure. The solvation portion is composed of, for example, water-soluble polymer chains or hydrophobic polymer chains.

The comb-like polymer (i) is not particularly restricted. Examples of the polymer include: a polymer comprising poly(ethyleneimine) or salts thereof having a structure comprising at least one poly(carbonyl-C3 to C6-alkyleneoxy) chain as disclosed in JP-A No. 5-177123, wherein each chain has 3 to 80 carbonyl-C3 to C6-alkyleneoxy groups and is linked to poly(ethyleneimine) by an amide group or a salt cross-linking group; a polymer comprising a reaction product between poly(lower alkylene)imine as disclosed in JP-A No. 54-37082 and polyester having free carboxylic acid groups, wherein at least two polyester chains are linked to each poly(lower alkylene)imine chain; and a pigment dispersant obtained by allowing an amine compound and a carboxylic group-containing prepolymer with a number average molecular weight of 300 to 7,000 to react, simultaneously or in an arbitrary order, with a high molecular weight epoxy compound having epoxy groups at the terminal as disclosed in Japanese Patent Application Publication (JP-B) No. 7-24746.

The polymer (i) of the comb-like structure preferably contains 2 to 3,000 pigment affinity groups in a molecule. Dispersion stability is insufficient when the number of the groups is less than 2. Handling of the polymer becomes difficult due to too high viscosity when the number of the groups exceeds 3,000, while color density decreases due to wide particle diameter distribution of the colloid particles. The more preferable number is 25 to 1,500.

The polymer (i) of the comb-like structure preferably has 2 to 1,000 side chains that constitute the solvation portion. Dispersion stability is insufficient when the number of the side chains is less than 2. Handling of the polymer becomes difficult due to too high viscosity when the number of the side chains exceeds 1,000, while color density decreases due to wide particle diameter distribution of the colloid particles. The more preferable number is 5 to 500.

The polymer (i) of the comb-like structure preferably has a number average molecular weight of 2,000 to 1,000,000. Dispersion stability is insufficient when the molecular weight is less than 2,000. Handling of the polymer becomes difficult due to too high viscosity when the molecular weight exceeds 1,000,000, while color density decreases due to wide particle diameter distribution of the colloid particles. The more preferable molecular weight is 4,000 to 500,000.

A plurality of pigment affinity groups are aligned along the main chain in the copolymer (ii) having a plurality of the pigment affinity portions comprising the pigment affinity groups in the main chain, and the pigment affinity groups are hanged, for example, from the main chain. The pigment affinity portion as used in the invention refers to a portion having one or a plurality of pigment affinity groups that function as anchors for adsorbing on the surface of the pigment.

Examples of the copolymer (ii) include: a reaction product of a mixture of polyisocyanate and a monohydroxy compound, monohydroxy carboxylic acid or monoaminocaruboxylic acid with a compound having at least one basic cyclic nitrogen and isocyanate-reactive group disclosed in JP-A No. 4-210220; a polymer in which groups having a plurality of tertiary amino groups or basic cyclic nitrogen atoms are hanged from a main chain comprising polyurethane/polyurea disclosed in JP-A Nos. 60-16631, 2-612 and 63-241018; a copolymer comprising sterically stabilizing units having water-soluble ply(oxyalkylene) chains, structural units and amino group-containing units disclosed in JP-A No. 1-279919, wherein the amino group-containing unit contains tertiary amino groups or acid addition salts thereof, or quaternary ammonium groups, and wherein the copolymer contains 0.025 to 0.5 meq of amino groups per 1 g of the copolymer; and an amphipathic copolymer comprising a main chain comprising an addition polymer and a stabilizer unit comprising at least one C1 to C4 alkoxypolyethylene or polyethylene-copropyleneglycol(meth)acrylate and having a weight average molecular weight of 2,500 to 20,000, wherein the main chain contains up to 30% by weight of non-functional structural unit and up to 70% by weight of the stabilizer unit and functional unit in total, the functional unit is a substituted or non-substituted styrene-containing unit, hydroxyl group-containing unit and carboxyl group-containing unit, and the ratios between the hydroxyl group and carboxyl group, between the hydroxyl group and styrene group, and between the hydroxyl group and propyleneoxy group or ethyleneoxy group are 1:0.10 to 26.1, 1:0.28 to 25.0, and 1:0.80 to 66.1, respectively, disclosed in JP-A No. 6-100642.

The copolymer (ii) preferably has 2 to 3,000 pigment affinity groups in one molecule. Dispersion stability is insufficient when the number of the groups is less than 2, while handling of the copolymer becomes difficult due to too high viscosity and color density decreases since the particle diameter distribution of the colloid particles is broad when the number of the groups exceeds 3,000. The number of the pigment affinity groups is more preferably 25 to 1,500.

The copolymer (ii) preferably has a number average molecular weight of 2,000 to 1,000,000. Dispersion stability is insufficient when the molecular weight is less than 2,000, while handling of the copolymer becomes difficult due to too high viscosity and color density decreases since the particle diameter distribution of the colloid particles is broad when the molecular weight exceeds 1,000,000. The number average molecular weight is more preferably 4,000 to 500,000.

While the linear polymer (iii) having the pigment affinity portions comprising the pigment affinity groups at one terminal of the main chain has one or plural pigment affinity portions comprising the pigment affinity groups only at one end of the main chain, the polymer has sufficient affinity to the surface of the pigment.

The linear polymer (iii) is not particularly restricted. Examples of the polymer include an A-B block polymer in which one of the block is basic as disclosed in JP-A No. 46-7294; an A-B block polymer in which an aromatic carboxylic acid is introduced into A-block as disclosed in U.S. Pat. No. 4,656,226; an A-B block polymer in which one end is a basic functional group as disclosed in U.S. Pat. No. 4,032,698; an A-B block polymer in which one end is an acidic functional group as disclosed in U.S. Pat. No. 4,070,388; and a polymer improved in weather resistant and anti-yellowing of an A-B block polymer disclosed in U.S. Pat. No. 4,656,226 by introducing an aromatic carboxylic acid into A-block as disclosed in JP-A No. 1-204914.

The linear polymer (iii) preferably has 2 to 3,000 pigment affinity groups in one molecule. Dispersion stability is insufficient when the number of the groups is less than 2, while handling of the copolymer becomes difficult due to too high viscosity and color density decreases since the particle diameter distribution of the colloid particles is broad when the number of the groups exceeds 3,000. The number of the pigment affinity groups is more preferably 5 to 1,500.

The linear polymer (iii) preferably has a number average molecular weight of 1,000 to 1,000,000. Dispersion stability is insufficient when the molecular weight is less than 1,000, while handling of the copolymer becomes difficult due to too high viscosity and color density decreases since the particle diameter distribution of the colloid particles is broad when the molecular weight exceeds 1,000,000. The number average molecular weight is more preferably 2,000 to 500,000.

Commercially available polymer dispersants for pigments may be used. Examples of the commercially available polymer dispersant include Solsperse 20000, Solsperse 24000, Solsperse 26000, Solsperse 27000 and Solsperse 28000 (manufactured by Zeneca Co.); Disperbyk-160, Disperbyk-161, Disperbyk-162, Disperbyk-163, Disperbyk-166, Disperbyk-170, Disperbyk-180, Disoer BYK 182, Disperbyk-184 and Disperbyk-190 (manufactured by BYK Chemie Co.); EFKA-46, EFKA-47, EFKA-48 and EFKA-49 (manufactured by EFKA Chemical Co.); Polymer 100, Polymer 120, Polymer 150, Polymer 400, Polymer 401, Polymer 402, Polymer 403, Polymer 450, Polymer 451, Polymer 452 and Polymer 453 (manufactured by EFKA Chemical Co.); Ajisper PB-711, Ajisper PA-111, Ajisper PB-811 and Ajisper PW-911 (manufactured by Ajinomoto Co.); Floren DOPA-158, Floren DOPA-22, Floren DOPA-17, Floren TG-730W, Floren G-700 and Floren TG-720W (manufactured by Kyoeisha Chemical Co.).

Since the polymer dispersant for pigments is a polymer with a graft structure having the pigment affinity groups on the side chain and having side chains constituting the solvation portions (polymer (i) with the comb-like structure), and a polymer having the pigment affinity groups on the main chain (the copolymer (ii) and liner polymer (iii)), dispersibility of the colloid particles is good and the polymer is suitable as a protective colloid for the metal colloid particles. A dispersion of the metal colloid particles containing a high concentration of the metal colloid particles may be obtained by using the polymer dispersant for pigments.

The polymer dispersant for pigments of the invention preferably has a softening temperature of 30° C. or more. The metal solid sol may form blocks during storage when the softening temperature is lower than 30° C. The softening temperature is preferably 40° C. or higher.

The content of the polymer dispersant for pigments is preferably 20 to 1,000 parts by weight relative to 100 parts by weight of the metal colloid particles. Dispersibility of the metal colloid particles tends to be insufficient when the content is less than 20 parts by weight, while a large amount of the polymer dispersant for pigments is mingled into the binder resin by blending the polymer dispersant with the paint and molded resin when the content exceeds 1,000 parts by weight to thereby deteriorate chemical and physical properties. The content is more preferably 50 to 650 parts by weight.

[2] Constitution of Display Element and Display Method
(Constitution of Display Element)

The constitution of the display element of the invention will be explained below with reference to FIG. 1. In the description of drawings hereinafter, members having the same function is given the same reference numerals throughout the drawings, and description thereof are omitted.

FIG. 1 shows an example of the display element of the invention (when the mobile fine particles are charge transfer fine particles), and schematic drawings showing the process for manufacturing the same. As shown in FIG. 1A, a first electrode 2 is formed on a first substrate 1 by sputtering. The first electrode 2 may be formed either on the entire surface of the first substrate 1 or on a part thereof depending on the purpose. Then, partition walls 3 are formed by a means such as coating for retaining a light control layer. An adhesive layer (not shown) is formed on the partition wall 3 (on the portion where a second substrate is bonded) thereafter, and a dispersion solution containing a prescribed amount of the mobile fine particles 7 and hetero-particles 6 is filled as shown in FIG. 1C. A second substrate 5 under which a second electrode 4 is formed is bonded so that the second electrode 4 faces the first electrode 2, and a display element (FIG. 1D) comprising a light control layer containing the mobile fine particles 7 and hetero-particles 6 is manufactured by applying a heat. The display element serves as a cell (light control unit cell).

Figure 1D:
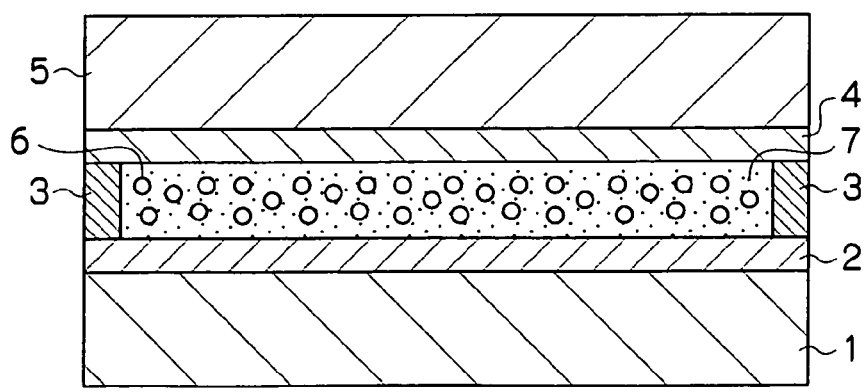
FIG. 1D shows the element after bonding the second substrate (completed element)

Partition walls (not shown) from other cells are provided at the front side and back side of the drawing in FIG. 1D. The display element is able to display a desired color by providing voltage applying part for enabling a voltage to be applied in the display element shown in FIG. 1D. The size of the light control unit cell is closely related to resolution of the display element, and the smaller cells permit a high-resolution display element to be manufactured. The size is usually in the range of 80 μm to 1 mm. No electrodes and voltage application part are necessary when magnetic particles are used in place of the mobile fine particles, and magnetic field generation part (such as a magnet) is provided in place of the electrode and voltage application part.

Figure 2A:
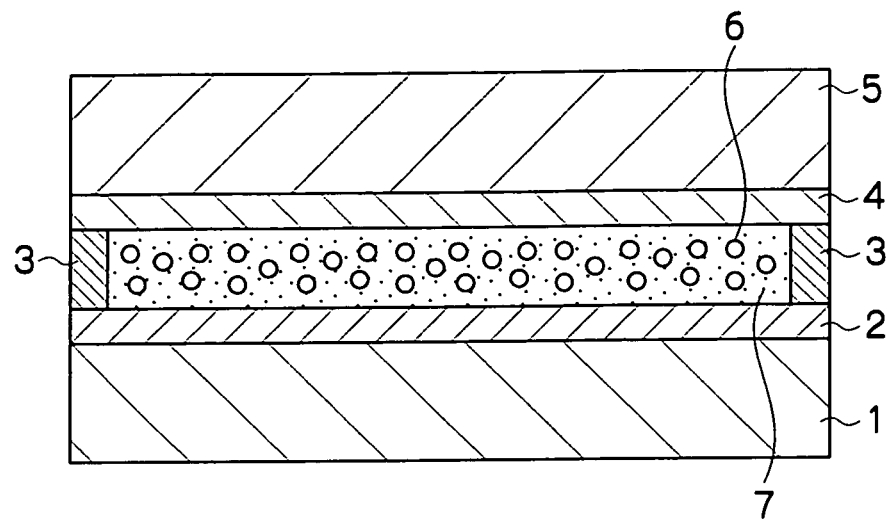
FIG. 2A shows the element before applying a voltage.

The operation of the display element of the invention will be explained with reference to FIG. 2. As shown in FIG. 2A, the mobile fine particles 7 are uniformly dispersed in the cell when no voltage is applied, and the color of mobile fine particles is observed as the color of the cell (for example, red). On the other hand, since the negatively charged mobile fine particles 7 are displaced to a positive electrode (the first electrode 2) side by applying a voltage, the color of the hetero-particles (for example, white) is displayed, and the display element is observed as a white display (see FIG. 2B).

A film or plate substrate of a polymer such as polyester (for example, polyethylene terephthalate), polyimide, methyl methacrylate, polystyrene, polypropylene, polyethylene, polyamide, nylon, polyvinyl chloride, polyvinylidene chloride, polycarbonate, polyether sulfone, silicone resin, polyacetal resin, fluorinated resin, cellulose derivatives and polyolefin; and inorganic substrates such as glass substrate, metal substrate and ceramic substrate are preferably used for the first substrate 1 and second substrate 5. At least one of the substrate is preferably permeable to light. The preferably used substrate has a light transmittance of at least 50% or more when the element is used as a light permeable optical element.

The material used for the first and second electrodes 2 and 4 preferably forms a metal oxide layer represented by tin oxide-indium oxide (ITO), tin oxide and zinc oxide layers. The preferably used substrate is a transparent electrode having light transmittance of at least 50% or more. When the element is used for a reflection optical element, the electrode material used for the electrode 2 at the remote side as viewed from the direction of vision forms a metal oxide layer represented by the tin oxide-indium oxide (ITO), tin oxide and zinc oxide layers, as well as a conductive polymer layer, carbon layer and a metal layer represented by copper, aluminum, gold, nickel and platinum layers.

These materials may be used alone, or as a laminate of a plurality of materials for the material of the first and second electrodes. The material may be used for a transmission display element when both the first and second electrodes 2 and 4 are transparent electrodes. Various sickness and size of the first and second electrodes 2 and 4 may be used depending on the display element, and are not particularly restricted.

The height of the partition wall 3 is not particularly restricted, and is usually in the range of 2 μm to 1 mm. While the width of the partition wall 3 is not particularly restricted, a smaller width is usually effective from the viewpoint of resolution, whiteness and brightness of the display element, and the width is usually 10 μm to 1 mm.

The material of the adhesive layer is not particularly restricted, and thermosetting resins and UV curable resins may be used. The material is selected so that it does not influence on the material of the partition wall and on the materials constituting the element such as the insulating liquid.

While the width of the electrode is not particularly restricted when the electrode is formed linearly, the width is usually 2 μm to 1 mm. The thickness of the electrode is usually 10 nm to 1 μm, although it is not particularly restricted.

Addressing switching elements such as wiring lines, thin film transistors, diodes having a metal-insulating layer-metal structure, variable capacitors and ferroelectrics may be formed on the display element of the invention depending on its application field.

The display element of the invention may comprise a plurality of the light control unit cells including the light control layer formed on the substrate, and the light control unit cells may be aligned parallel to the substrate surface (see FIG. 5). The plural light control unit cells may be laminated. Forming a plurality of the light control layers permits at least any one of red, blue and green colors to be developed by the layers. For example, at least one color of the red, blue and green colors may be developed by forming at least three layers of the light control layers.

(Display Method)

The display element as described above is used for the display method of the invention. The method comprises selecting at least one of the following steps and displaying: a step of displaying a black color by allowing the mobile fine particles that are able to develop a color in dispersion state to aggregate; a step of displaying a color by allowing the mobile fine particles to disperse; and a step of displaying a white color by reflection of the hetero-particles having characteristics different from those of the mobile fine particles. Specifically, display is possible by aligning in parallel or by laminating the display elements that display a desired color, and by appropriately selecting the light control layer to which an electric field or a magnetic field is applied. Since the display element of the invention is used in the display method in the invention as described above, display of a color with less dependency on the angle of vision and good contrast is possible. The term "dispersion" refers to a chromatic color by dispersion, while the term "aggregation" refers to a black color when the particles are not dispersed.

EXAMPLES

While examples of the invention will be explained in more detail with reference to examples, the invention is not restricted by these examples.

Example 1

As shown in FIG. 2A, ITO is deposited at a thickness of 50 nm by sputtering to form the first electrode 2 on the first substrate 1 made of a glass with a thickness of 0.7 mm. After forming a layer for the partition wall by coating using a photosensitive polyimide varnish, the partition wall 3 with a height of 50 μm and a width of 20 μm is formed by exposure and wet etching.

After forming a heat fusion adhesive layer (not shown) on the partition wall 3, an ethanol solution of gold colloid (volume average particle diameter 20 nm) containing white particles (titanium oxide, volume average particle diameter 10 μm) as hetero-particles is filled in the space within the partition wall, and a display element is manufactured by bonding with heating the second substrate 5 made of a glass on which ITO is deposited. Since the gold colloid particles develop red color in a dispersion state, the display element is observed as red when viewed from above the display element. The content of gold in the ethanol solution is 0.1% by weight, and the content of the hetero-particles is 70% by weight. The volume filling factor of the hetero-particles in the light control layer is 70% by volume.

Figure 2B:
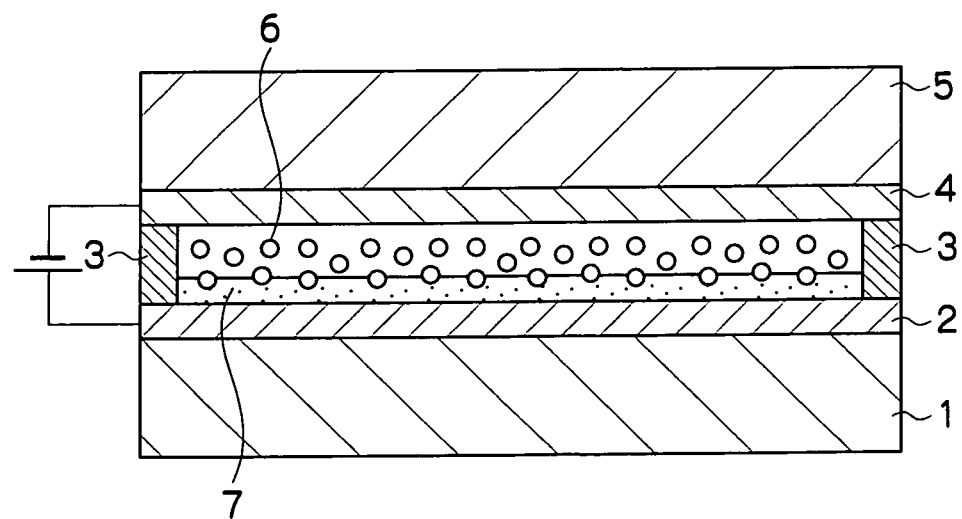
FIG. 2B shows the element when a voltage has been applied.

As shown in FIG. 2B, a voltage of 5 V is applied to both electrodes using the display element thus manufactured so that the first electrode is a positive electrode. Since the dispersed gold colloid particles (charge transfer fine particles) are negatively charged, the particles are observed to displace to the positive side electrode by applying the voltage. Thereby, when the first electrode is a positive electrode and the second electrode is a negative electrode, the gold colloid particles are displaced to the first electrode side to display white particles through the transparent second electrode, and the display element is observed to be white. The gold colloid particles return to the original dispersion state by applying an alternating voltage to the electrode displaying white color, and the element develops red color.

Example 2

Figure 3:
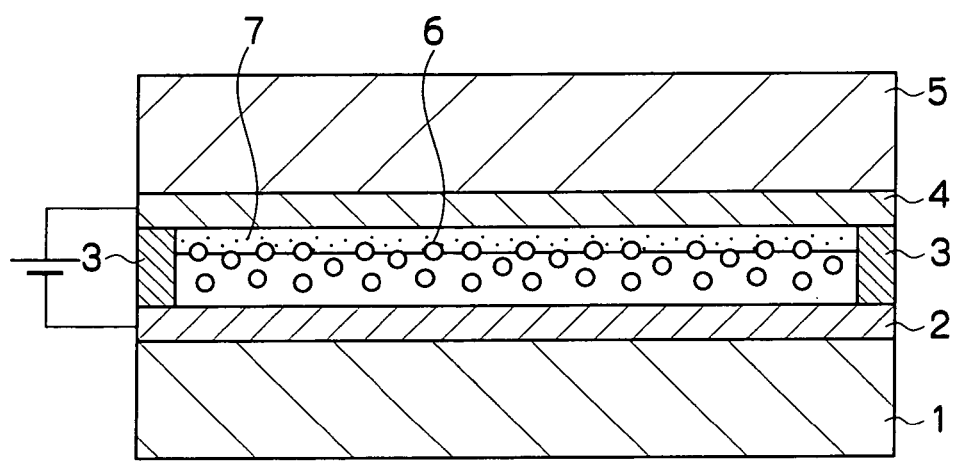
FIG. 3 shows another embodiment of the display element of the invention.

The gold colloid particles are observed as black by coagulation. Accordingly, polarity of the applied voltage in Example 1 is reversed as shown in FIG. 3, and the voltage is applied so that the first electrode is a negative electrode and the second electrode is a positive electrode. Consequently, the gold colloid particles are displaced to the second electrode side, or to the upper side, and are observed as black. When the density of the white color observed in Example 1 and the density of the black color observed in Example 2 are determined with a spectrophotometer Spectro Eye (manufactured by Gretag Macbeth Co.), the contrast is measured to be 10 which is a good value as the display element.

Example 3

Figure 4A:
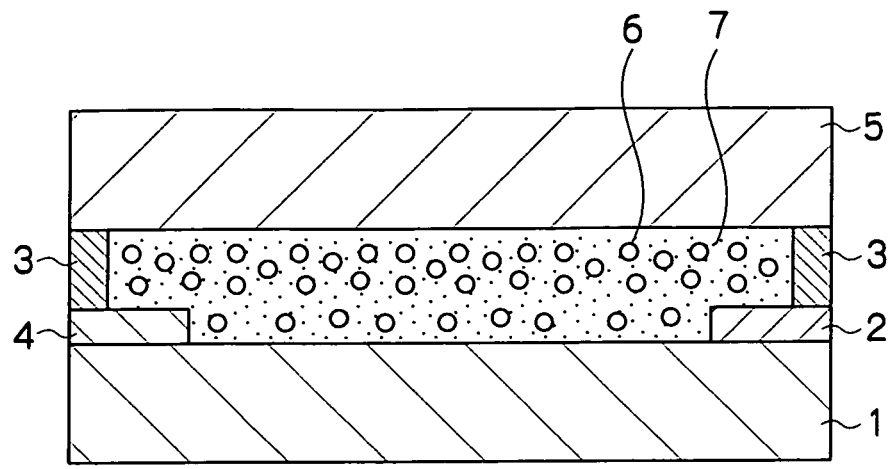
FIG. 4A shows the element before applying a voltage.

As shown in FIG. 4A, ITO is deposited at a thickness of 40 nm by sputtering on the first substrate 1 made of a glass with a thickness of 0.7 mm, and the first and second electrodes 2 and 4 are formed by patterning into lines. The line width of the electrodes is set to 30 μm, and the space between the electrodes is set to 200 μm. Subsequently, after forming a layer for the partition walls by coating using a photosensitive polyimide varnish, the partition wall 3 with a height of 50 μm and a width of 20 μm is formed by exposure and wet etching.

Then, after forming a heat fusion adhesive layer (not shown) on the partition wall 3, an aqueous gold colloid solution (volume average particle diameter 20 nm) containing white particles (titanium oxide, volume average particle diameter 10 μm) is filled in the space within the partition wall, and a display element is manufactured by bonding a second substrate 5 made of a glass with heating. Since the aqueous solution of the gold colloid particles develops red color in a dispersion state, the display element is observed as red when viewed from above the display element. The content of gold in the aqueous colloid solution is 0.1% by weight, while the content of the hetero-particles in the aqueous colloid solution is 60% by weight. The volume filling factor of the hetero-particles in the light control layer is 70% by volume.

Figure 4B:
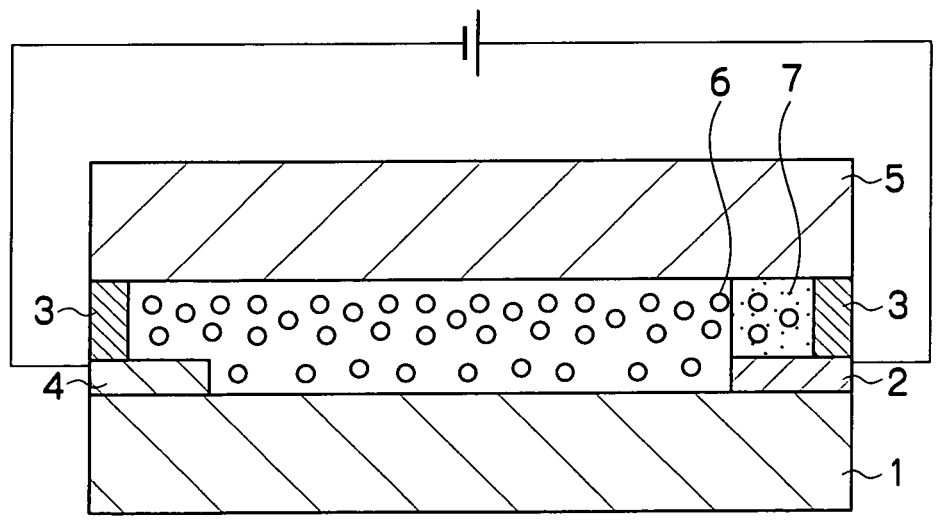
FIG. 4B shows the element when a voltage has been applied.

In this way, a voltage of 40 V is applied to both electrodes as shown in FIG. 4B using the display element prepared as described above so that the first electrode is a positive electrode. Since the dispersed gold colloid particles (charge transfer particles) are negatively charged, the particles are observed to be displaced to the positive side electrode. When the first electrode is a positive electrode and the second electrode is a negative electrode, the particles are displaced to the first electrode side to display white particles through the transparent second substrate, and the display element is observed to be white. When an alternative voltage is applied to the electrode of the element developing white color, the gold colloid particles return to their original dispersion state to display red color.

Example 4

As shown in FIG. 5A, ITO is deposited at a thickness of 40 nm on the first substrate 1 made of a glass having a thickness of 0.7 mm, and the ITO film is patterned as a line to form the first electrode 2. Here, the width of the line electrode is set to 200 μm, and the space between the electrodes is set to 20 μm. Subsequently, after forming a layer for a partition walls by coating using a photosensitive polyimide varnish, the partition wall 3 with a height of 50 μm and a width of 20 μm is formed on the inter-electrode space by exposure and wet etching.

Here, after forming a heat fusion adhesive layer (not shown) on the partition walls 3, white particles (titanium oxide, particle diameter 10 μm) and three kinds of aqueous gold colloid solutions (with volume average particle diameters of 20 nm, 30 nm and 50 nm, respectively) that develop red, green and blue colors, respectively, are filled in each cell. Then, the display element is manufactured by bonding with heating the second substrate 5 made of a glass with ITO, which is manufactured by the same method as in the first substrate. The aqueous gold colloid solutions contain gold colloid particles with a volume average particle diameter of 20 nm in a proportion of 0.1% by weight, gold colloid particles with a volume average particle diameter of 30 nm in a proportion of 0.1% by weight, and gold colloid particles with a volume average particle diameter of 50 nm in a proportion of 0.1% by weight, respectively. The content of the hetero-particles is 70% by weight. The volume filling factor of the hetero-particles in the light control layer is 70% by volume.

A voltage of 40 V is applied to both electrodes using the display element thus manufactured so that the first electrode and second electrode of the cells displaying red color and blue color are positively charged and negatively charged, respectively. Since the gold colloid particles (charge transfer particles) developing red color and blue color, respectively, are negatively charged, the particles are observed to be displaced to the positive electrode side by applying the voltage. The gold colloid particles are dispersed only in the cell developing green color, and the display element is observed to be green color.

Example 5

An iron powder with a volume average particle diameter of 4 μm is prepared by spray-drying pentacarbonyl iron (pentacarbonyl iron described in U.S. Pat. No. 4,803,143) at 250° C. Subsequently, 0.3 g of an antioxidant and 30 g of an ethylene-vinyl acetate copolymer resin are dissolved in 500 g of THF (manufactured by Wako Pure Chemical Industries, Co.). 12 g of titanium oxide, 18 g of copper phthalocyanine and 90 g of the iron powder are dispersed in the solution above. This solution is spray-dried at 50° C. to obtain blue magnetic particles (mobile fine particles) with a particle diameter of 8 μm.

Figure 6A:
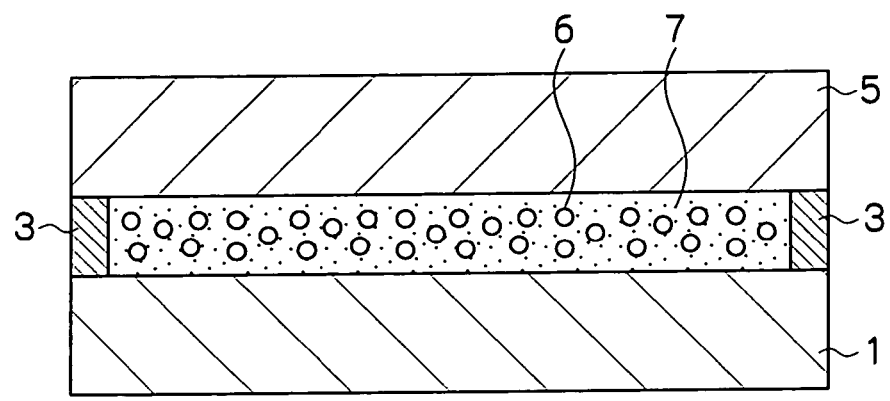
FIG. 6A shows the element before applying a magnetic field.
Figure 6B:
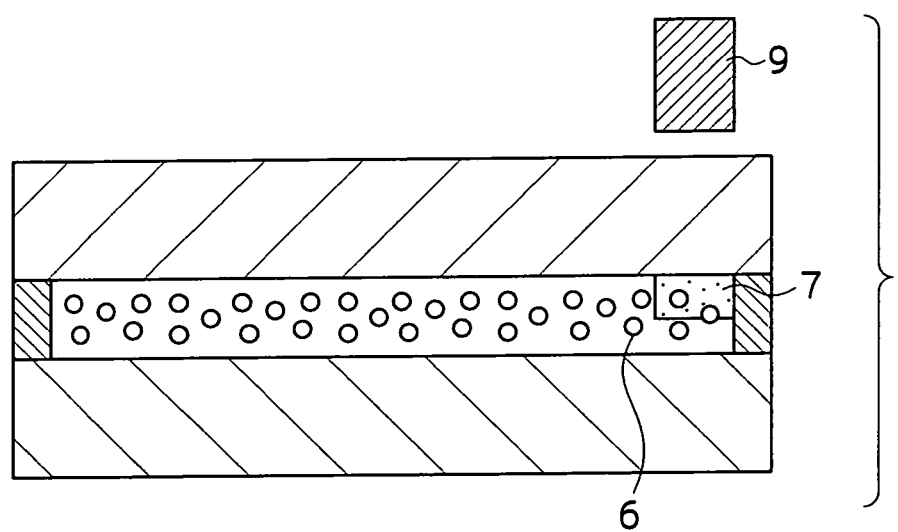
FIG. 6B shows the element when a magnetic field has been applied.

After forming a layer for a partition walls on a glass substrate (first substrate 1) with a thickness of 1 mm as shown in FIG. 6A using photosensitive polyimide varnish, a partition walls 6 with a height of 300 μm and a width of 200 μm is formed by exposure and wet etching. After providing an adhesive layer on a bonding surface between the partition wall and second substrate, an isoparaffin solution (dispersion solution) in which white particles (titanium oxide, particle diameter 20 μm) and the blue magnetic particles are dispersed is filled within the partition walls 3. A display element is formed by bonding a second substrate made of a glass with heating. The content of the magnetic particles and the content of the hetero-particles are 20% by weight and 60% by weight, respectively. The volume filling factor of the hetero-particles in the light control layer is 60% by volume.

The display element obtained is observed to be blue from above the display element. Then, the blue magnetic particles are affected by the magnetic field by placing an external magnet 9 close to the display element to displace the particles to the magnet side. The display element showed the color of the white particles, or white color.

Example 6

The first electrode 2 is formed as shown in FIG. 2A by depositing ITO at a thickness of 50 nm by sputtering on the first substrate 1 made of a glass with a thickness of 0.7 mm. Then, after forming a layer for a partition wall by coating using a photosensitive polyimide varnish, the partition wall 3 with a height of 50 μm and a width of 20 μm is formed by exposure and wet etching.

After forming a heat fusion adhesive layer (not shown) on the partition wall 3, an aqueous gold colloid solution (volume average particle diameter 45 nm) containing white particles (titanium oxide, volume average particle diameter 10 μm) as the hetero-particles is filled in the space within the partition wall. The display element is manufactured by bonding the second substrate 5 made of a glass on which ITO is deposited with heating. Since the aqueous solution of the gold colloid particles develops blue color in a dispersion state, the display element is observed as blue as viewed from above the display element. The content of gold and the content of the hetero-particles in the aqueous gold colloid solution are 0.1% by weight and 70% by weight, respectively. The volume filling factor of the hetero-particles in the light control layer is 70% by volume.

A voltage of 20 V is applied to both electrodes as shown in FIG. 2B using the display element thus manufactured so that the first electrode is a positive electrode. Since the dispersed gold colloid particles (charge transfer particles) are negatively charged, the particles are observed to be displaced to the positive electrode side by applying a voltage. Consequently, the gold colloid particles are displaced to the first electrode side when the first electrode and second electrode are positive and negative electrodes, respectively, and white particles are visible through the transparent second electrode to enable the display element to be observed as a white display. The colloid particles return to their original dispersion state by applying an alternating voltage to the electrode of the element displaying white color, and the element developed blue color. The blue color does not change even by observing the display element obliquely from above the display, which shows no dependency on the angle of vision.

Example 7

ITO is deposited at a thickness of 50 nm on the first substrate 1 made of a glass with a thickness of 0.7 mm by sputtering as shown in FIG. 2A to form the first electrode 2. Then, after forming a layer for the partition wall by coating using photosensitive polyimide varnish, the partition wall 3 with a height of 50 µm and a width of 20 µm is formed by exposure and wet etching.

After forming a heat fusion adhesive layer (not shown) on the partition wall 3, an aqueous gold colloid solution (volume average particle diameter 60 nm) containing white particles (titanium oxide, volume average particle diameter 10 µm) as the hetero-particles is filled into the space within the partition wall, and the display element is manufactured by bonding with heating the second substrate 5 made of a glass on which ITO is deposited. The contents of gold and hetero-particles in the aqueous gold colloid solution are 0.1% by weight and 70% by weight, respectively. The volume filling fraction of the hetero-particles in the light control layer is 70% by volume.

Since the aqueous gold colloid particles develop blue color in dispersion state, the display element is observed to be blue when viewed from above the display element. However, transparency is a little poor as compared with the display element (Example 6) using the gold colloid particles with a volume average particle diameter of 45 nm, although there are no practical problems. Accordingly, the display element manufactured in Example 6 develops brighter blue color.

A voltage of 20 V is applied to both electrodes as shown in FIG. 2B using the display element thus manufactured so that the first electrode is a positive electrode. Since the dispersed gold colloid particles (charge transfer particles) are negatively charged, the particles are observed to be transferred to the positive electrode side by applying a voltage. Consequently, the gold colloid particles are transferred to the first electrode side when the first electrode and second electrode are positive and negative electrodes, respectively, and white particles are visible through the transparent second electrode to enable the display element to be observed as a white display. The colloid particles return to their original dispersion state by applying an alternating voltage to the electrode of the element displaying white color, and the element developed blue color.

What is claimed is:

1. A display medium comprising a light control layer, wherein the light control layer comprises mobile fine particles developing a color in a dispersion state and hetero-particles having characteristics different from those of the mobile fine particles, the hetero-particles are white colored particles, a volume average particle diameter of the hetero-particles is larger than that of the mobile fine particles, and a volume filling factor of the hetero-particles in the light control layer is in a range of 30 to 95% by volume.

2. The display medium of claim 1 comprising a plurality of light control unit cells including the light control layer, wherein respective light control unit cells are aligned parallel to a substrate.

3. The display medium of claim 1 comprising a plurality of light control unit cells including the light control layer, wherein the plural light control unit cells comprise light control unit cells developing red, blue and green colors, respectively.

4. The display medium of claim 1, wherein the mobile fine particles are charge transfer fine particles.

5. The display medium of claim 4, wherein the charge transfer fine particles are metal colloid particles having a color strength due to surface plasmon resonance.

6. The display medium of claim 5, wherein the metal colloid particles comprise at least one of gold and silver.

7. The display medium of claim 5, wherein the metal colloid particles have a volume average particle diameter in a range of 1 to 100 nm.

8. The display medium of claim 7, wherein the metal colloid particles have a volume average particle diameter in the range of 2 to 50 nm.

9. The display medium of claim 1, wherein the hetero-particles have a volume average particle diameter in a range of 0.1 to 50 µm.

10. The display medium of claim 9, wherein the hetero-particles have a volume average particle diameter in the range of 1 to 20 µm.

11. The display medium of claim 1, wherein the hetero-particles are spacer particles.

12. The display medium of claim 1, wherein the mobile fine particles have a volume average particle diameter in a range of 2 to 50 nm and the hetero-particles have a volume average particle diameter in a range of 1 to 20 µm.

13. The display medium of claim 12, wherein the display medium is configured such that the mobile fine particles are operable for moving through a gap between the hetero-particles.

14. The display medium of claim 12, wherein the hetero-particles are white colored particles and the mobile fine particles are metal colloid particles having a color strength due to surface plasmon resonance.

15. The display medium of claim 1, wherein the hetero-particles do not move by application of a voltage or an electric field.

16. A display element comprising a display medium having a light control layer and a fine particle control part, wherein the light control layer comprises mobile fine particles for developing a color in a dispersion state and hetero-particles having characteristics different from those of the mobile fine particles, the fine particle control part is provided close to the light control layer, a volume average particle diameter of the hetero-particles is larger than that of the mobile fine particles, and a volume filling factor of the hetero-particles in the light control layer is in a range of 30 to 95% by volume.

17. The display element of claim 16, wherein the fine particle control part is an electric field applying part that applies an electric field to the light control layer.

18. The display element of claim 17, wherein the electric field applying part is a pair of electrodes.

19. The display element of claim 16, wherein the hetero-particles are white colored particles.

20. The display element of claim 16 comprising a plurality of light control unit cells including the light control layer, wherein respective light control unit cells are aligned parallel to a substrate.

21. The display element of claim 16 comprising a plurality of light control unit cells including the light control layer, wherein the plural light control unit cells comprises light control unit cells developing red, blue and green colors, respectively.

22. The display element of claim 16, wherein the mobile fine particles are metal colloid particles having a color strength due to surface plasmon resonance.

23. The display element of claim 22, wherein the metal colloid particles comprise at least one of gold and silver.

24. The display element of claim 22, wherein the metal colloid particles have a volume average particle diameter in a range of 1 to 100 nm.

25. The display element of claim 24, wherein the metal colloid particles have a volume average particle diameter in the range of 2 to 50 nm.

26. The display element of claim 16, wherein the hetero-particles are spacer particles.

27. The display element of claim 26, wherein the spacer particles are white colored particles.

28. A method of using a display medium, the method comprising:
   providing the display medium comprising a light control layer, wherein the light control layer comprises mobile fine particles developing a color in a dispersion state and hetero-particles having characteristics different from those of the mobile fine particles, a volume average particle diameter of the hetero-particles is larger than that of the mobile fine particles, and a volume filling factor of the hetero-particles in the light control layer is in a range of 30 to 95% by volume, and
   at least one of the following steps:
      displaying black color by allowing the mobile fine particles operable for developing a color in a dispersion state to aggregate;
      displaying a color by allowing the mobile fine particles to disperse; or
      displaying white color by reflection of the hetero-particles having characteristics different from those of the mobile fine particles.

29. A display medium comprising a light control layer, wherein the light control layer comprises mobile fine particles developing a color in a dispersion state and hetero-particles having characteristics different from those of the mobile fine particles, a volume average particle diameter of the hetero-particles is larger than that of the mobile fine particles, the hetero-particles do not move by application of a voltage or an electric field, and a volume filling factor of the hetero-particles in the light control layer is in a range of 30 to 95% by volume.

30. A display medium comprising a light control layer, wherein the light control layer comprises mobile fine particles developing a color in a dispersion state and hetero-particles having characteristics different from those of the mobile fine particles, the mobile fine particles have a volume average particle diameter in a range of 2 to 50 nm, the hetero-particles have a volume average particle diameter in a range of 1 to 20 μm, and a volume filling factor of the hetero-particles in the light control layer is in a range of 30 to 95% by volume.

\* \* \* \* \*